Jan. 25, 1966        P. E. SHICK        3,231,444

METHOD OF HEAT SEALING THERMOPLASTIC ARTICLES

Filed March 5, 1962        2 Sheets-Sheet 1

INVENTOR.
PHILIP E SHICK
BY J. F. Teigland
W. A. Schaich

Jan. 25, 1966  P. E. SHICK  3,231,444
METHOD OF HEAT SEALING THERMOPLASTIC ARTICLES
Filed March 5, 1962  2 Sheets-Sheet 2

INVENTOR.
PHILIP E SHICK
BY J. F. Teigland
W. A. Schick

United States Patent Office 3,231,444
Patented Jan. 25, 1966

3,231,444
METHOD OF HEAT SEALING THERMOPLASTIC ARTICLES
Philip E. Shick, Toledo, Ohio, assignor to Owens-Illinois Glass Company, a corporation of Ohio
Filed Mar. 5, 1962, Ser. No. 177,441
4 Claims. (Cl. 156—282)

This invention relates to a method of heat sealing a thermoplastic fitment to a sheet of thermoplastic material, and more particularly to a method of heat sealing a thermoplastic dispensing fitment to the exterior surface of one of two adjacent sheets of thermoplastic material. This invention also relates to a sealed thermoplastic bag having a dispensing fitment heat sealed to its exterior surface.

Thermoplastic bags, formed from polyethylene, for example, are generally fabricated from continuous webs of thermoplastic bag tubing. The tubing is transversely heated sealed and cut to the desired bag length. In the conventional process the bags are left open at one end. When it is desired to heat seal a fitment to the bag, the bag is slipped over an anvil and the fitment is heat sealed to the bag by the conventional heated bar or heated shoe method, with the anvil serving to keep the side walls of the bag separate. After the fitment is heat sealed to the side wall on the bag, the open end of the bag is then heat sealed closed. For many applications, such as the packaging of milk, it is desirable to have a sterile bag. The interior of thermoplastic bag tubing, when it is initially formed, is sterile. A sterile sealed thermoplastic bag can be formed by transversely heat sealing the bag tubing in two spaced apart locations and then severing the tubing outside of those locations. Conventional methods of heat sealing a dispensing fitment to the bag then become impossible because under conventional methods of heat sealing the side walls of the bag will become adhered to each other during the heat sealing step unless a separator is placed between them. It is also desirable to be able to heat seal fitments to the exterior surface of continuous webs of thermoplastic bag tubing where the length of the tubing makes it impossible to place a separator between the side walls of the tubing.

Accordingly, it is an object of this invention to provide a method of heat sealing a thermoplastic fitment to the exterior surface to one of two adjacent plies of thermoplastic material.

Another object of this invention is to provide a method for heat sealing a thermoplastic fitment to the exterior surface of a sealed thermoplastic bag.

A further object of this invention is to provide an expeditious and economical method of heat sealing fitments to thermoplastic material.

A still further object of this invention is to provide a sealed bag having a dispensing fitment heat sealed thereto.

Other objects and advantages of this invention will become apparent from the following description taken in conjunction with the accompanying drawings wherein are set forth, by way of illustration and example, the preferred embodiments of this invention.

The attainment of the objects of this invention is provided by the provision of a thermoplastic fitment which has one or more outwardly extending ribs on the surface of the fitment which is to be heat sealed to a second thermoplastic surface. The rib or ribs are of relatively small cross sectional area. Heat, such as in the form of radiant heat, is directed against the surface on which the rib or ribs are located and because of the relatively large surface area in proportion to the amount of cross sectional area of the ribs, only the ribs are reduced to a softened or molten stage. The surface of the fitment with the ribs in a softened or molten stage, is then pressed against the second thermoplastic surface to heat seal it thereto by means of the ribs which fuse to the second surface.

Figure 3:
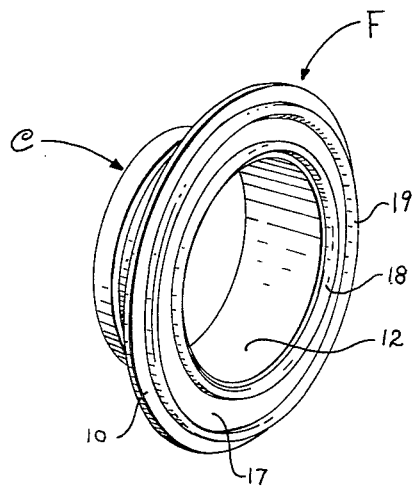
FIG. 3 is a perspective view showing the dispensing fitment described in conjunction with the preferred embodiment of this invention.
Figure 4:
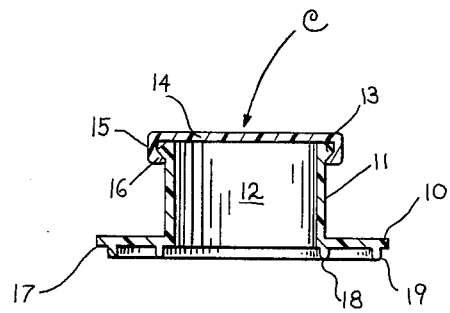
FIG. 4 is a vertical cross sectional view of the dispensing fitment shown in FIG. 3.

Referring to FIGS. 3 and 4, the dispensing fitment F used in conjunction with the preferred embodiment of this invention is preferably formed of high density polyethylene. The fitment F comprises a circular flange 10 having an annular upstanding side wall 11 extending therefrom and defining a dispensing opening 12 which extends through the flange 10. An annular retaining bead 13 is formed at the upper end of the side wall 11. A cap C is provided to close the upper end of the dispensing opening 12. The cap C comprises a circular panel 14 having at its peripheral edge a depending annular skirt 15. A radially inwardly extending annular shoulder 16 is formed at the low end of the skirt 15 and is arranged to engage the retaining bead 13 when the cap C is in place on the fitment. On the bottom plane surface 17 of the flange 10 are formed a pair of axially outwardly extending annular ribs 18 and 19, respectively. The ribs 18 and 19, which are continuous and concentric with the dispensing opening 12, have a relatively small cross sectional area with respect to the flange 10.

Figure 1:
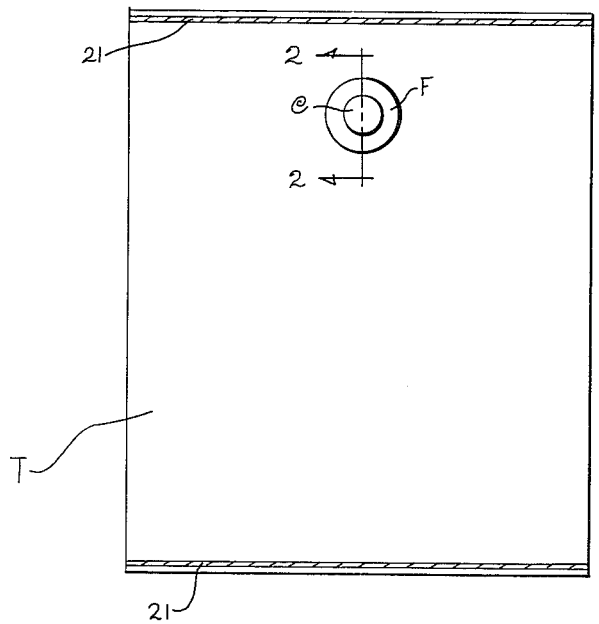
FIG. 1 is a top plan view of a sealed thermoplastic bag having a dispensing fitment heat sealed thereto.
Figure 2:
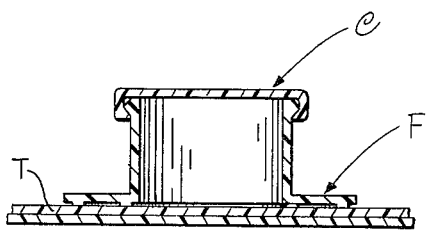
FIG. 2 is a vertical sectional view taken along the line 2—2 of FIG. 1.
Figure 5:
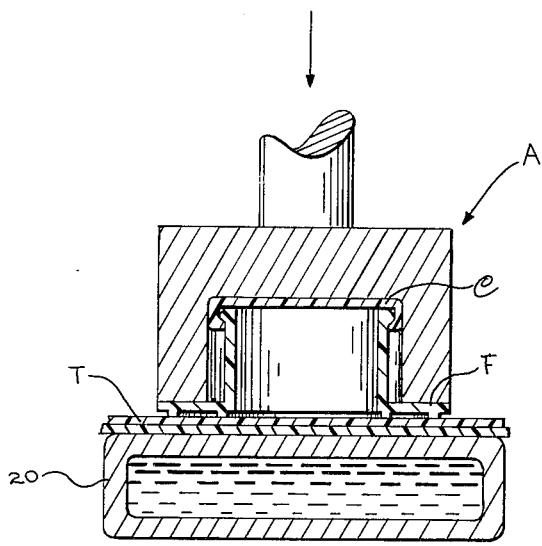
FIG. 5 is a vertical sectional view showing a dispensing fitment being pressed against the exterior surface of one of two imperforated sheets of thermoplastic material.

In the practice in the method of this invention, a length of thermoplastic bag tubing T is heat sealed by suitable conventional means at both ends (21) as shown on FIG. 1. The thermoplastic bag tubing can be formed of high density polyethylene or the like. It is preferable that the fitment and the bag tubing be of compatible materials. Radiant heat is directed at the bottom surface or plane surface 17 of the fitment F. Such heat can be provided by any suitable conventional means, such as an infra-red heater bar. Heat can also be provided by a Teflon coated hot plate in direct contact with ribs 18 and 19. The heat is applied for a sufficient length of time to reduce the ribs 18 and 19 to a softened or molten state, appropriate for heat sealing. Referring to FIG. 5, the fitment is then pressed against the outer surface of the bag such as by means of an appropriately shaped anvil A. To reduce any possibility of adherence at the interface of the plies of the bag, a water cooled chamber 20 is preferably placed in contact with the bottom ply so as to conduct heat away from the interfaces of the plies. The ribs 18 and 19, which are integral with the fitment, are thereby fused to the exterior surface of the top ply of the bag. The ribs 18 and 19 are continuous, as mentioned before, so as to provide a liquid tight seal between the bag and the fitment. The bag side wall is imperforate in the area of the fitment. Immediately prior to filling the bag, the bag side wall adjacent the dispensing opening 12 is punctured to permit filling the bag. The dispensing fitment is then closed by the cap C.

The preferred embodiment of this invention, as described is that of heat sealing a thermoplastic fitment to the outer of two adjacent plies of thermoplastic material without the necessity of separating the two plies. It is to be understood, however, that the method of this invention can be used equally well to apply a fitment to one ply of the thermoplastic material. Since only a relatively small cross sectional area of the fitment is heated to a softened or molten condition, there is a substantial saving in heating requirements and also a substantial saving in the heating cycle time provided by the method of this invention.

It will, of course, be understood that various details of construction may be modified through a wide range without departing from the principles of this invention, and it is not therefore, the purpose to limit the patent granted hereon otherwise than necessitated by the scope of the appended claims.

I claim:

1. The method of heat sealing the plane surface of a thermoplastic fitment to a planar sheet of thermoplastic material, which method comprises: providing said plane surface with at least one upstanding rib of cross-sectional area less than the plane surface; heating the rib to place it in a molten condition; and pressing said plane surface against the planar sheet while said rib is in a molten condition to fuse said rib to said sheet and secure said fitment to said sheet.

2. The method of heat sealing the plane surface of a thermoplastic fitment to the exterior planar surface of one of two sheets of a flattened length of thermoplastic tubing, which method comprises: providing said plane surface with at least one upstanding rib of cross-sectional area less than the plane surface; heating the rib to place it in a molten condition; pressing said plane surface against an area of the planar surface of said one of the sheets while said rib is in a molten condition to fuse said rib to said one of the sheets and secure said fitment to the flattened length of tubing; and cooling the other of the sheets in the area opposite the area of said one sheet against which said plane surface is pressed during the pressing step to prevent the two sheets from adhering to one another.

3. The method of heat sealing an annular closure fitment of thermoplastic material to a ply of a flattened bag of thermoplastic material, said fitment having an annular plane surface and a dispensing opening extending through said annular plane surface, which method comprises: providing the plane surface with at least one outstanding rib having a cross-sectional area less than the plane surface, said rib being continuous and surrounding the dispensing opening; heating the rib to place it in a molten condition; and pressing said plane surface and rib against the exterior of said ply of said bag while said rib is in a molten condition to weld said rib to the exterior of said ply.

4. The method of heat sealing an annular closure fitment of thermoplastic material to one ply of a flattened bag of thermoplastic material, said fitment having an annular plane surface and a dispensing opening extending through said annular plane surface, which method comprises: providing the annular plane surface with two upstanding ribs each of which has a cross-sectional area less than the plane surface, each of said ribs being continuous and concentric with the other rib and surrounding the dispensing opening; heating the ribs to place them in a molten condition; pressing the plane surface and ribs against an area of the exterior of said one ply of said bag while the ribs are in a molten condition to weld the ribs to the exterior of said ply; and cooling the exterior surface of the other ply of said bag in an area opposite the area of said one ply during the pressing step to prevent said one ply and said other ply from adhering to one another.

References Cited by the Examiner

UNITED STATES PATENTS

| 2,762,420 | 9/1956 | Stanton | 156—282 |
| 2,861,718 | 11/1958 | Winzen | 222—107 |
| 2,891,279 | 6/1959 | Neumann | 156—282 |
| 2,981,443 | 4/1961 | Baldwin | 222—541 XR |
| 3,038,217 | 6/1962 | Harris | 156—294 |
| 3,058,624 | 10/1962 | Westlake | 222—107 |
| 3,069,303 | 12/1962 | Scholle | 156—253 |
| 3,083,134 | 3/1963 | Fairclough et al. | 156—247 |

FOREIGN PATENTS

| 1,235,343 | 5/1960 | France. |

EARL M. BERGERT, *Primary Examiner.*

L. J. DEMBO, *Examiner.*